(12) United States Patent
Jung

(10) Patent No.: US 9,527,455 B2
(45) Date of Patent: Dec. 27, 2016

(54) BICYCLE CARRIER

(71) Applicant: Yong-Ho Jung, Goyang (KR)

(72) Inventor: Yong-Ho Jung, Goyang (KR)

(*) Notice: Subject to any disclaimer, the term of this patent is extended or adjusted under 35 U.S.C. 154(b) by 124 days.

(21) Appl. No.: 14/707,109

(22) Filed: May 8, 2015

(65) Prior Publication Data

US 2015/0321619 A1    Nov. 12, 2015

(30) Foreign Application Priority Data

May 12, 2014    (KR) ........................ 10-2014-0056297

(51) Int. Cl.
*B60R 9/06*    (2006.01)
*B60R 11/00*   (2006.01)
*B60R 5/04*    (2006.01)

(52) U.S. Cl.
CPC ............... *B60R 11/00* (2013.01); *B60R 5/04* (2013.01); *B60R 9/06* (2013.01); *B60R 2011/0015* (2013.01)

(58) Field of Classification Search
CPC ............. B60R 9/06; B60R 9/10; B60R 9/048; B60R 7/043; B60R 7/08; B60R 11/00; B60R 2011/0036; B62H 3/00; Y10S 224/94; B60P 3/07
USPC ................................................ 224/275, 511
See application file for complete search history.

(56) References Cited

U.S. PATENT DOCUMENTS

| | | | | |
|---|---|---|---|---|
| 3,848,784 A * | 11/1974 | Shimano | .................. | B60R 9/10 |
| | | | | 211/22 |
| 5,275,319 A * | 1/1994 | Ruana | ....................... | B60R 9/05 |
| | | | | 224/316 |
| 5,362,173 A * | 11/1994 | Ng | ......................... | B60R 9/048 |
| | | | | 224/315 |
| 5,497,927 A * | 3/1996 | Peterson | .................. | B60R 9/10 |
| | | | | 224/519 |
| 5,560,498 A * | 10/1996 | Porter | ...................... | B62H 3/08 |
| | | | | 211/20 |
| 6,382,480 B1 * | 5/2002 | Egly | ......................... | B60R 5/00 |
| | | | | 224/310 |
| 2015/0151688 A1 * | 6/2015 | Back | ....................... | B60R 5/003 |
| | | | | 224/539 |

* cited by examiner

*Primary Examiner* — Adam Waggenspack
(74) *Attorney, Agent, or Firm* — Lex IP Meister, PLLC

(57) ABSTRACT

The present invention relates to a bicycle carrier which can be mounted inside a vehicle for carrying a bicycle. The bicycle carrier includes: a frame which is formed so as to be settled on a flat bottom; a screw shaft which is joined with the frame; a sleeve which is joined with the screw shaft; fastening nuts which are joined with both ends of the screw shaft; a holding rail which is mounted on one side of the frame; and fixing means for fixing the frame in a vehicle, and thus can be mounted in a rear space of a vehicle, such as a medium or large sized SUV or a van, for easily fixing a bicycle by separating the front wheel from the bicycle.

12 Claims, 9 Drawing Sheets

BICYCLE CARRIER

BACKGROUND OF THE INVENTION

1. Field of the Invention

The present invention relates to a bicycle carrier which can be mounted inside a vehicle for carrying a bicycle.

2. Description of the Related Art

With an increase of interest in health and leisure, bicycle sales are increasing. Along with the increase in the bicycle sales, various goods, facilities, and infrastructure projects related to bicycles are also significantly increasing.

Recently, as people want to get out of cities and ride bicycles, technologies related to carriers for safely carrying bicycles are being actively researched. In the beginning, as examples of the carriers described above, carriers were developed in a form for fixing bicycles to roof racks on top of vehicles. However, in this case, in order to load and unload bicycles, heavy lifting of the bicycles to and from the top of vehicles is required, thus causing difficulty and inconvenience. For this reason, recently, carriers fixable on the trunks provided at the rear ends of vehicles have been developed to easily load and unload bicycles from the vehicles.

Accordingly, various technologies for providing carriers to be mounted on trunks provided at the rear ends of vehicles for carrying bicycles have been disclosed in Korean Patent Publication No. 2012-0012105 (published on Feb. 9, 2012).

However, these technologies are embodied such that bicycles are mounted outside of vehicles. Therefore, they are vulnerable in terms of safety, and are vulnerable to bicycle theft while vehicles are parked.

SUMMARY OF THE INVENTION

An object of the present invention is to provide a bicycle carrier which can be mounted in a rear space of a vehicle such as a medium or large sized SUV or a van for easily fixing a bicycle by separating a front wheel from the bicycle.

A bicycle carrier according to an embodiment of the present invention includes: a frame which is composed of a pair of front and rear components for fixing a fork for holding a shaft of a front wheel of a bicycle and a rear wheel of the bicycle, respectively, in a state of which the fork and the rear wheel are settled thereon, and is settled on a flat bottom, and has a plurality of coupling holes formed in both sides; a screw shaft which is fastened through the coupling holes of both sides of the frame and on which the fork is fit; a sleeve which is interposed between blades of the fork in a state of which the sleeve is fit on the screw shaft; fastening nuts which are turned in a state of which the fastening nuts are joined with portions of the screw shaft positioned on both sides of the sleeve, thereby fastening or releasing the fork; a holding rail which is mounted on one side of the frame and on which the rear wheel of the bicycle is settled; and fixing means which are formed to be fastened to the front or rear of the frame while being fixed in a vehicle.

On both sides of the frame, the plurality of coupling holes may be formed at regular intervals in a front-rear direction.

The sleeve may be composed of two parts separable in a left-right direction.

On the outer surface of each of the fastening nuts, a knob may be formed integrally with the corresponding fastening nut so as to protrude upward from the frame.

The holding rail may have inclined faces provided on both sides for supporting the left and right of the rear wheel.

The holding rail may include a binding member for binding a settled rear wheel.

Means for mounting the holding rail on the frame may be composed of brackets which are joined between one side of the frame and the holding rail.

On both sides of the frame, auxiliary coupling holes may be formed to connect the brackets.

The fixing means each may have one or more rings at each of both end portions such that the rings can be used to fix a band to stuff fixing hooks formed on both sides of the bottom of the trunk of the vehicle, or to a second row of seats.

The fixing means may include bolt units which pass through and are fastened to the frame.

The fixing means each may include a main body which is formed so as to have a predetermined length and is fixed to the frame, and length adjusting members which have rings and are screwed to both end portions of the main body and can be turned for length adjustment.

The bicycle carrier may further include a tie rod for connecting a bicycle with another bicycle or the vehicle, thereby supporting the bicycle.

The tie rod may include inner and outer bars which are joined by fitting and are rotatable and adjustable in its length by adjusting pressing bolts formed at its end portions, and tongs which are pivotally joined with both ends of the bars.

Alternatively, the tie rod may include inner and outer bars which are joined by fitting and are rotatable and adjustable in its length by adjusting pressing bolts formed at its end portions, and bands which are pivotally joined with both ends of the bars and are adjustable in its length using adjustment holes.

The bicycle carrier according to an embodiment of the present invention may be mounted in a rear space of a vehicle, such as a medium or large sized SUV or a van, for easily fixing a bicycle by separating its front wheel from the bicycle. Therefore, it is possible to carry a bicycle more safely, preventing accidents such as theft.

DESCRIPTION OF THE PREFERRED EMBODIMENTS

Figure 1:
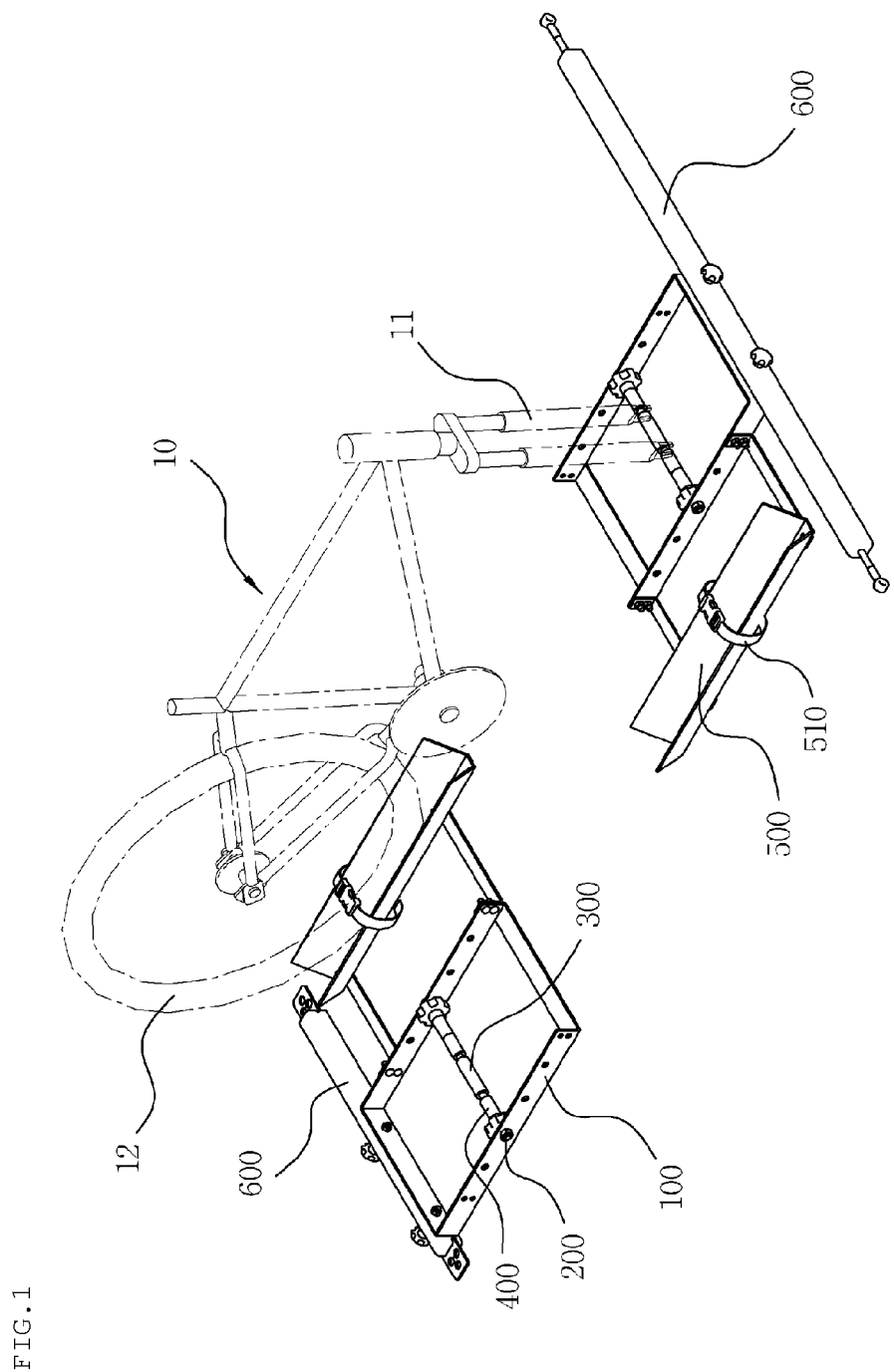
FIG. 1 is a perspective view illustrating a bicycle carrier according to an embodiment of the present invention.

An exemplary embodiment of the present invention will be described in detail with reference to the accompanying drawings.

As shown in FIGS. 1 to 9, a bicycle carrier is configured so as to include a frame 100 which is formed so as to be settled on the bottom, a screw shaft 200 which is joined with the frame, a sleeve 300 which is joined with the screw shaft, fastening nuts 400 which are fit on both sides of the screw shaft, a holding rail 500 which is mounted on one side of the frame, and fixing means 600 for fixing the frame in a vehicle.

As described above, the bicycle carrier is composed of a pair of front and rear components that are capable of fixing a fork for holding the shaft of the front wheel of a bicycle and the rear wheel of the bicycle, respectively, when the fork and the rear wheel are settled thereon. In this case, in general, the fork has shaft holes formed in the lower end portions of the blades such that the shaft of the front wheel of the bicycle can be fit into the shaft holes, thereby being held.

The bicycle carrier can be mounted in a vehicle, such as a medium or large sized SUV or a van, such that while the front wheel is separated, the fork for holding the shaft of the front wheel of a bicycle, and the rear wheel can be settled and fixed on the bicycle carrier. Therefore, in order to mount and use the bicycle carrier according to an embodiment of the present invention, at least, the second row of seats positioned at the rear portion of the driver's seat of the vehicle should be able to be folded down flat such that it is possible to secure a space together with the trunk, and fixing hooks for fixing loaded stuffs should be provided on both sides of the rear side of the bottom of the trunk. For this reason, recently, sales of medium or large sized SUVs for camping or leisure have increased rapidly, and most of these vehicles have fixing hooks for loading stuffs.

Figure 4:
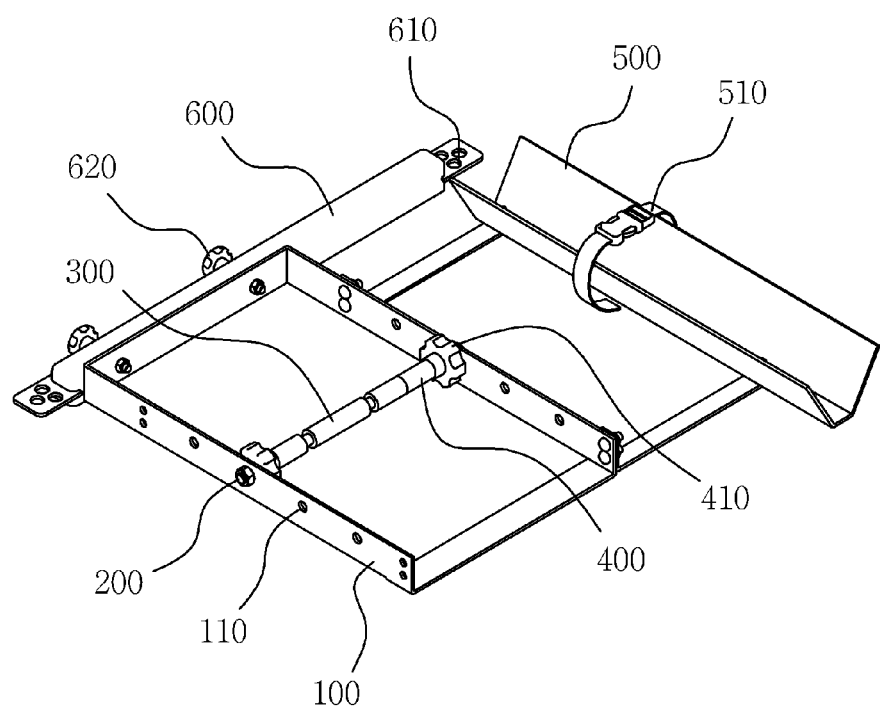
FIG. 4 is an enlarged view illustrating a main portion of the bicycle carrier according to an embodiment of the present invention.
Figure 5A:
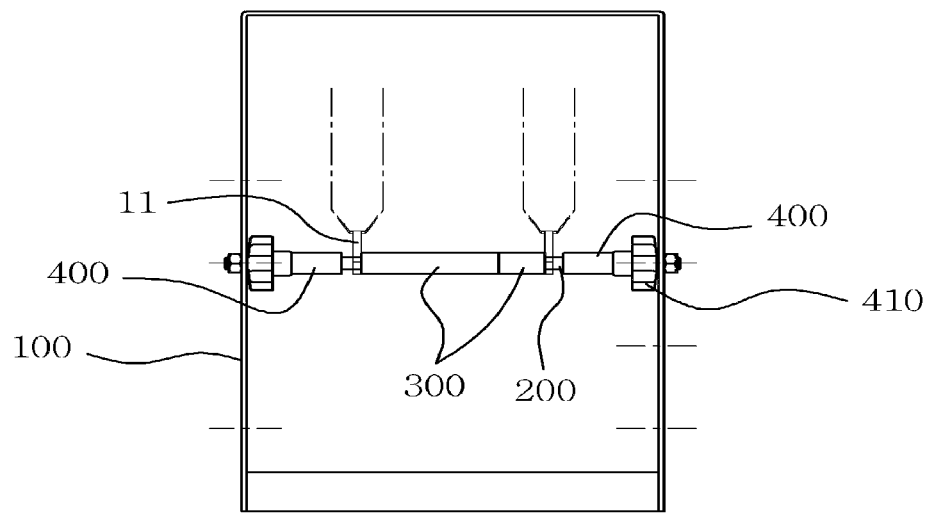
FIGS. 5A and 5B are a view illustrating a state of which the bicycle carrier according to an embodiment of the present invention is used.
Figure 5B:
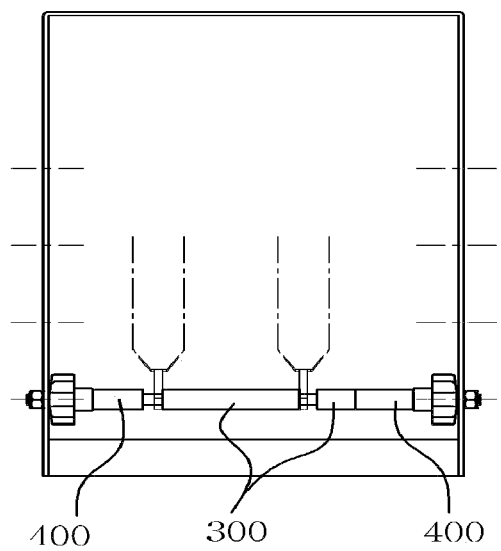

The frame 100 is settled on the flat bottom and has a number of coupling holes 110 in both sides. In this case, the coupling holes 110 are formed at both sides of the frame 100, at regular intervals in the front-rear direction, as shown in FIGS. 4, 5A, and 5B, such that it is possible to adjust the fastening position of the screw shaft 200 (to be described below) according to the size of a bicycle 10 or the mounting position of the frame 100.

Figure 7:
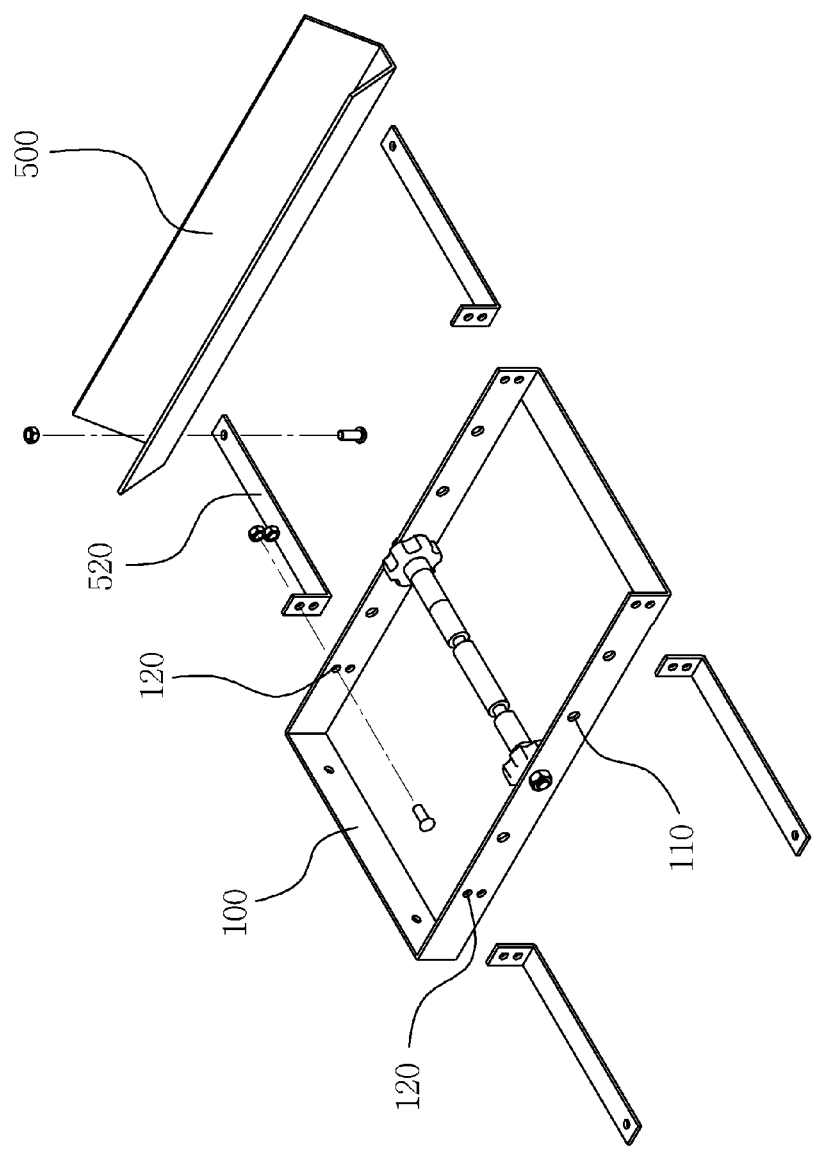

As an example, as shown in FIG. 7, auxiliary coupling holes 120 are formed at both sides of the frame 100 such that it is possible to fasten brackets 520 (to be described below) using bolts and nuts. If the auxiliary coupling holes 120 are formed at both sides of the frame 100, it is possible to selectively fasten the brackets 520 (to be described below) to any one side of the frame 100. For example, in Korea, it is convenient to fasten the brackets 520 to the left side of the frame 100, thereby fixing the holding rail 500. In contrast, in other countries, it may be convenient to fasten the brackets to the right side of the frame, thereby fixing the holding rail. For this reason, it is preferable that it should be possible to switch the fastening direction of the brackets anywhere and at anytime depending on circumstances.

The screw shaft 200 is formed such that it can be fit in the fork 11 of the bicycle 10 while being fastened through the coupling holes 110 formed at both sides of the frame 100. In the case of fastening the screw shaft 200 to the frame 100, as shown in FIGS. 4, 5A, and 5B, nuts may be used, for example.

The sleeve 300 is formed such that it is interposed between the blades of the fork 11 when it is joined with the screw shaft 200. That is, in a case of fixing the fork 11 using the fastening nuts 400 (to be described below), the sleeve 300 presses the fork 11 together with the fastening nuts 400, thereby supporting and fixing the fork 11, such that the interval between the blades of the fork 11 are kept.

As an example, the sleeve 300 is composed of two or more parts separable in the left-right direction as shown in FIGS. 4, 5A, and 5B. For example, forks 11 for bicycles generally have widths of 100 mm and 75 mm. Although most bicycles have a fork width of 100 mm, a considerable number of bicycles have a fork width of 75 mm. Therefore, the sleeve 300 can be composed of two separable parts whose full width in the left-right direction is 100 mm and which have widths of 75 mm and 25 mm, respectively. According to this configuration, as shown in FIGS. 5A and 5B, the separable parts of the sleeve 300 can be selectively moved according to the width of the fork 11.

The fastening nuts 400 are formed so as to be fit on portions of the screw shaft 200 positioned on both sides of the sleeve 300 and are rotatable to fasten or release the fork 11.

For example, on the outer surface of each of the fastening nuts 400, a knob 410 is formed integrally with the corresponding fastening nut 400 so as to protrude upward from the frame. If the knobs 410 are formed integrally with the fastening nuts 400 as described above, it is easier to fasten or release the fork 11 using the fastening nut 400.

The holding rail 500 is formed so as to be mounted on one side of the frame 100 such that the rear wheel 12 of the bicycle 10 can be settled thereon. Since the rear wheel 12 of the bicycle 10 is settled on the holding rail 500, mobility of the fixed bicycle decreases.

As an example, the holding rail 500 may have inclined faces on both sides such that the inclined faces support the left and right of the rear wheel 12. If inclined faces are formed on both sides as described above, a wheel of a bicycle 10 can be settled at the center of the holding rail 500, regardless of a width of the wheel.

As another example, the holding rail 500 may be configured so as to include a binding member 510 for binding a settled rear wheel 12. The binding member 510 is for binding a settled wheel to the holding rail 500, and for example, the binding member 510 may be composed of a general band and hook-like buckles for fastening two ends of the band, as shown in FIG. 1.

As means for mounting the holding rail 500 on the frame 100, the brackets 520 are provided so as to be joined between one side of the frame 100 and the holding rail 500. It is preferable that such brackets 520 are bent in an L shape as shown in FIG. 7 and fastened to one side of the frame 100 and the bottom of the holding rail by bolts and nuts.

The fixing means 600 are formed so as to be fixed to the front or rear of the frames 100 while being fixed inside the vehicle. That is, the fixing means 600 are joined to the front of one of the pair of front and rear frames and the rear of the other, respectively, as shown in FIG. 1.

Figure 2:
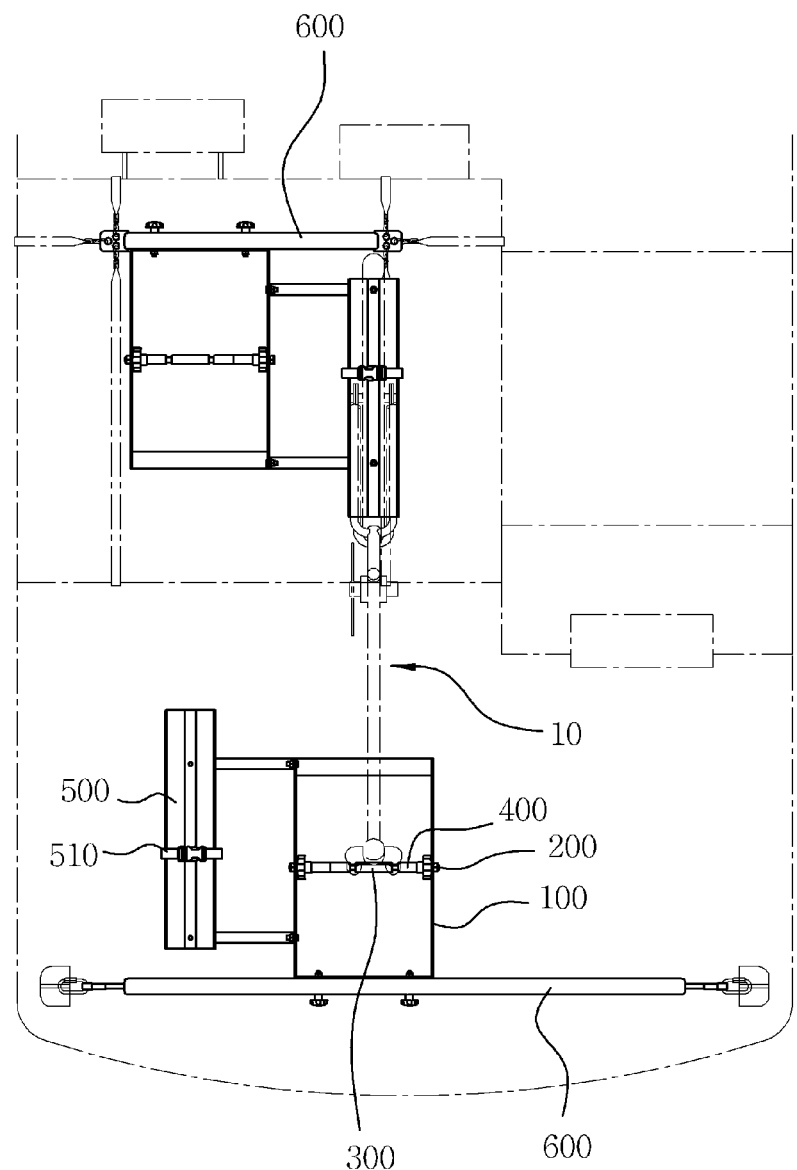
FIG. 2 is a plan view illustrating a state of which the bicycle carrier according to an embodiment of the present invention is mounted.
Figure 3:
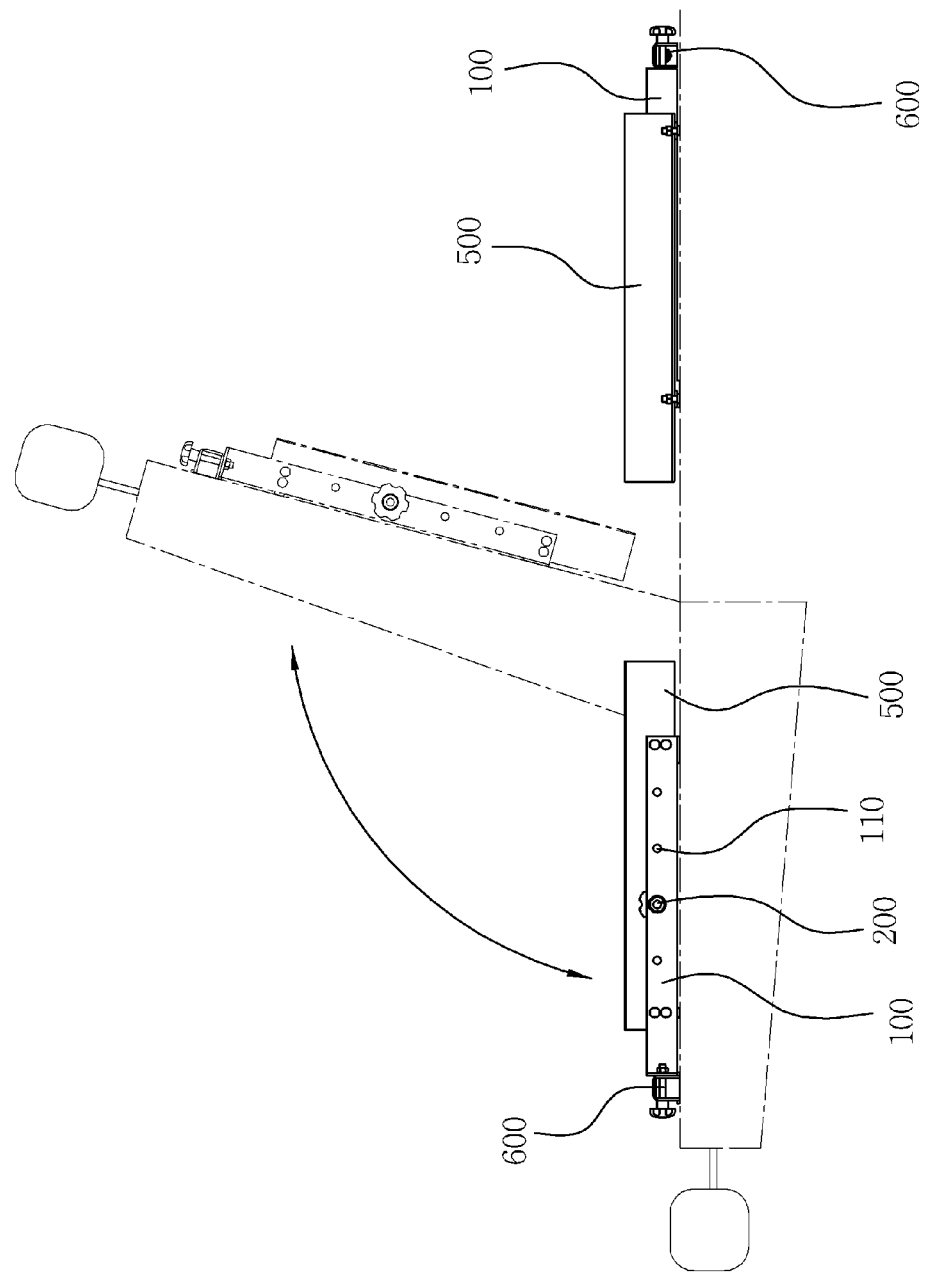
FIG. 3 is a side view illustrating the state of which the bicycle carrier according to an embodiment of the present invention is mounted.

As an example, the fixing means 600 each may be configured so as to have one or more ring 610 at each of both end portions such that the rings can be used to fix a band to the stuff fixing hooks formed on both sides of the bottom of the trunk of the vehicle or to the second row of seats, as shown in FIGS. 2 and 3.

Figure 6:
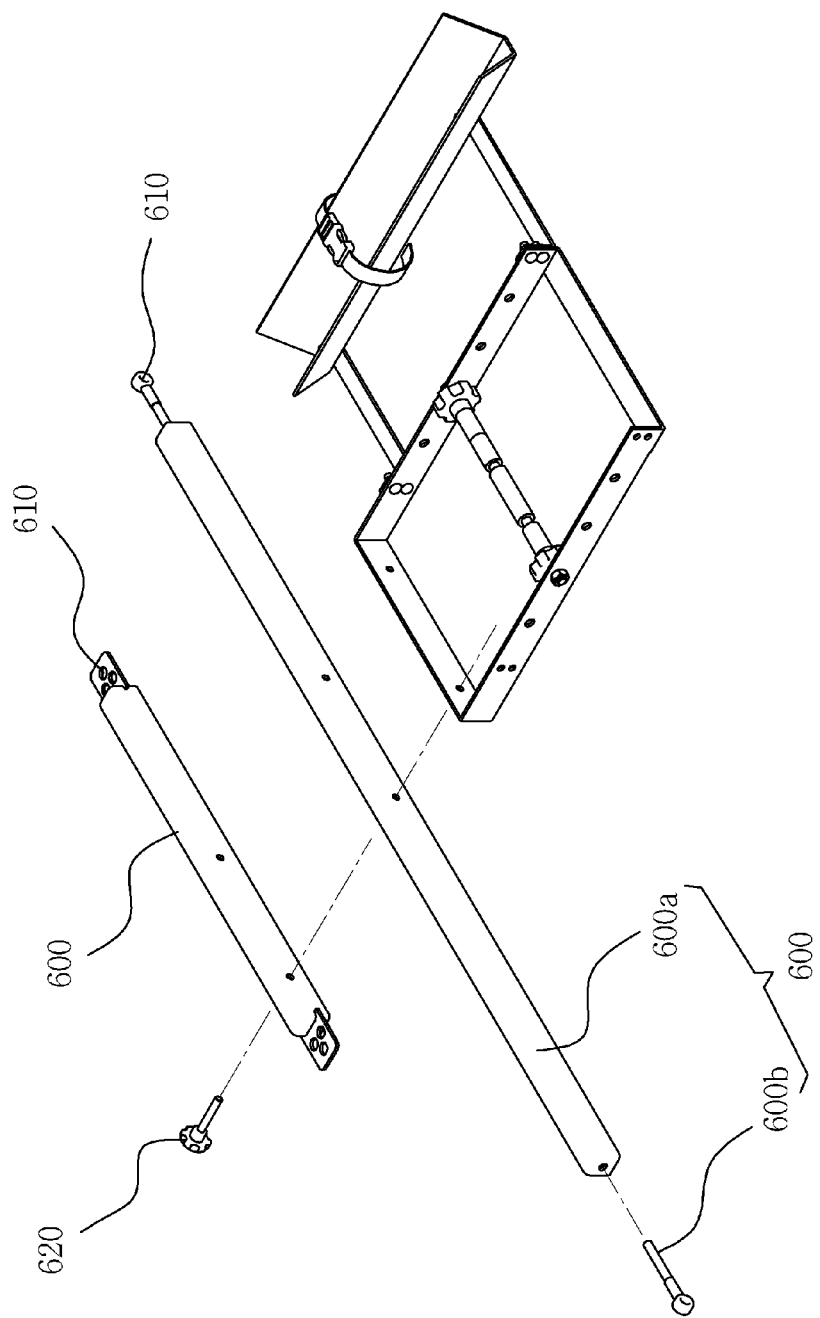
FIGS. 6 and 7 are exploded views illustrating the bicycle carrier according to an embodiment of the present invention.

As another example, the fixing means 600 may be configured so as to include bolt units 620 such that the bolt units pass through and are fastened to the frames 100 as shown in FIG. 6. In this case, since the fixing means 600 can be attached to or detached from the frames 100 using the bolt units 620, usage becomes more convenient.

As a further example, the fixing means 600 each may be configured so as to include a main body 600a which is formed so as to have a predetermined length and is fixed to the frame 100, and length adjusting members 600b which have rings 610, and are screwed to both end portions of the main body 600a, and can be turned for length adjustment. According to this configuration, when the fixing means are bound to the vehicle, the length adjusting members 600b can be turned using the rings, whereby it is possible to make the binding tighter.

In one embodiment, the present invention may be configured so as to include tie rods 700 for connecting a bicycle with another bicycle or a vehicle. That is, the tie rods 700 are joined, for example, between two bicycles and between a bicycle and a headrest, thereby minimizing mobility of the bicycles.

Figure 8:
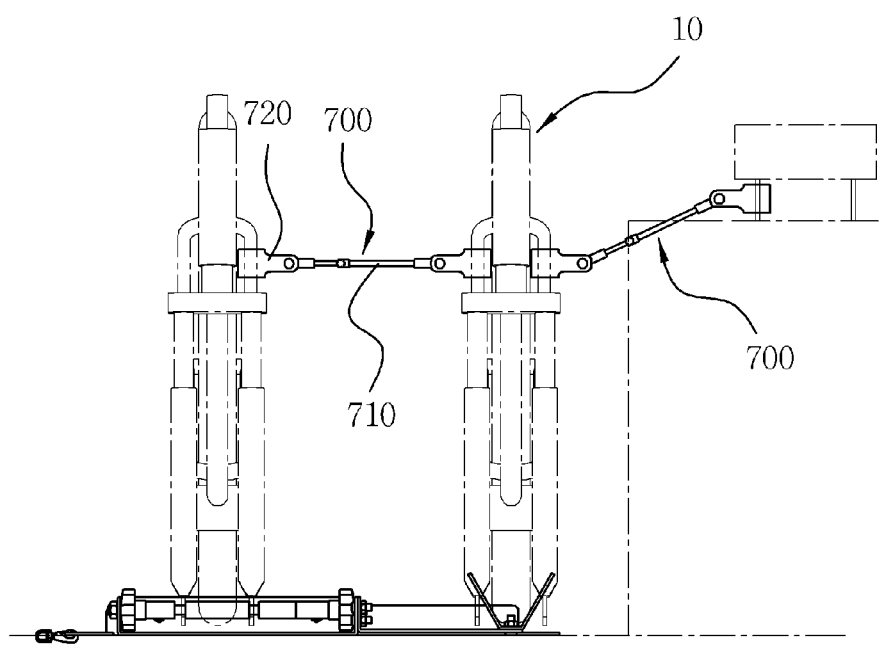
FIGS. 8 and 9 are explanatory views illustrating the bicycle carrier according to embodiments of the present invention.
Figure 9:
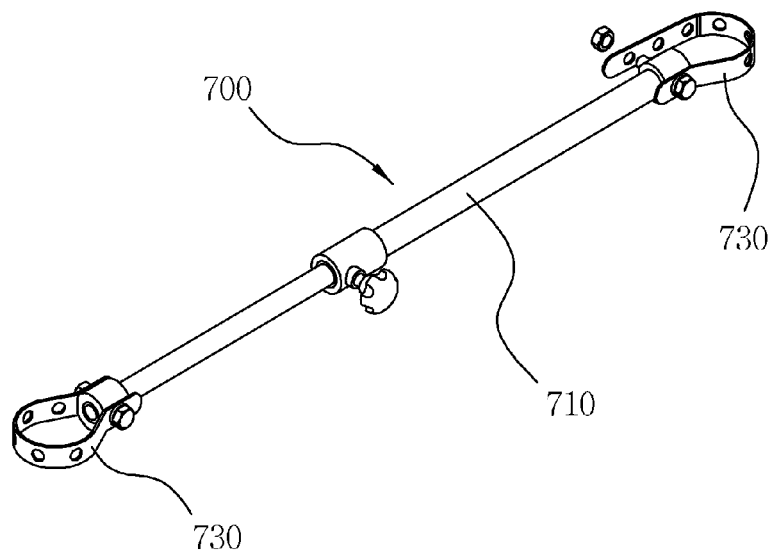

As an example, as shown in FIG. 8, each tie rod 700 may be composed of inner and outer bars 710 which are joined by fitting and are rotatable and adjustable in its length by adjusting pressing bolts formed at its end portions, and tongs 720 which are pivotally joined with both ends of the bars 710. As another example, as shown in FIG. 9, each tie rod 700 may be composed of inner and outer bars 710 which are joined by fitting and are rotatable and adjustable in its length by adjusting pressing bolts formed at its end portions, and bands 730 which are pivotally joined with both ends of the bars 710 and are adjustable in its length using adjustment holes. According to these examples, after adjusting the lengths of the bars 710 according to the distance between bicycles or the distance between a bicycle and a headrest, and adjusting the angles of the tongs 720 or the bands 730, it is possible to easily use the tie rods 700.

According to an embodiment of the present invention configured as described above, it is possible to mount the bicycle carrier in a rear space of a vehicle, such as a medium or large sized SUV or a van, and to easily fix a bicycle using a fork by separating the front wheel from the bicycle. Therefore, it is possible to more safely carry bicycles and prevent accidents such as theft.

Also, it is possible to fix two bicycles at once as shown in FIG. 2. In this case, the two bicycles can be mounted in opposite directions, thus minimizing the mounting space. Therefore, even when two bicycles are fixed, a person can sit in one seat of the second row of the vehicle. Also, even when the bicycle carrier of the present invention is installed, the second row of seats can be folded and unfolded at any time as shown in FIG. 3.

What is claimed is:

1. A bicycle carrier comprising: a frame which is composed of a pair of front and rear components configured to hold a fork of a front wheel of a bicycle, the frame having a flat bottom for resting in a vehicle interior and has a plurality of coupling holes formed on the front component, with corresponding holes on the rear component; a screw shaft which is fastened through the coupling holes of both sides of the frame and on which the fork can be fit; a sleeve which is interposed between blades of the fork when the sleeve is fit on the screw shaft; fastening nuts located between the front and rear components of the frame which can be turned while the fastening nuts are joined with portions of the screw shaft positioned on both sides of the sleeve, thereby fastening or releasing the fork; a holding rail which is mounted on one side of the frame by brackets which are joined to one side of the frame and to the holding rails via the coupling holes and on which the rear wheel of another bicycle can be held; and fixing means which are formed to be fastened to a front or rear portion of the frame to fix it in place in a vehicle.

2. The bicycle carrier according to claim 1, wherein:
on both sides of the frame, the plurality of coupling holes is formed at regular intervals in a front-rear direction.

3. The bicycle carrier according to claim 1, wherein:
the sleeve is composed of two parts that are separable in a left-right direction.

4. The bicycle carrier according to claim 1, wherein:
on an outer surface of each of the fastening nuts, a knob is formed integrally with a corresponding fastening nut.

5. The bicycle carrier according to claim 1, wherein:
the holding rail has inclined faces for supporting left and right portions of the rear wheel.

6. The bicycle carrier according to claim 1, wherein:
the holding rail includes a binding member for binding the rear wheel that is settled.

7. The bicycle carrier according to claim 1, wherein:
the fixing means each have at least one ring at each of both end portions such that the at least one ring can be used to fix a band to stuff fixing hooks formed on both sides of a bottom of a trunk of the vehicle, or to a second row of seats in the vehicle.

8. The bicycle carrier according to claim 1, wherein:
the fixing means include bolt units which pass through and are fastened to the frame.

9. The bicycle carrier according to claim 7, wherein:
the fixing means each include a main body which is formed so as to have a predetermined length and is fixed to the frame, and length adjusting members which have rings and are screwed to both end portions of the main body and can be turned for length adjustment.

10. The bicycle carrier according to claim 1, further comprising:
a tie rod for connecting the bicycle with another bicycle or the vehicle, thereby supporting the bicycle.

11. The bicycle carrier according to claim 10, wherein:
the tie rod includes:
inner and outer bars which are joined by fitting and are rotatable and adjustable in its length by adjusting pressing bolts formed at its end portions, and
tongs which are pivotally joined with both ends of the bars.

12. The bicycle carrier according to claim 10, wherein:
the tie rod includes:
inner and outer bars which are joined by fitting and are rotatable and adjustable in its length by adjusting pressing bolts formed at its end portions, and
bands which are pivotally joined with both ends of the bars and are adjustable in its length using adjustment holes.

* * * * *